Dec. 3, 1935.  H. L. WELCH  2,022,833
MECHANISM TO BE USED UPON MOTOR VEHICLES
Filed Oct. 20, 1933  2 Sheets-Sheet 1

INVENTOR.
Herman L Welch

Dec. 3, 1935.  H. L. WELCH  2,022,833
MECHANISM TO BE USED UPON MOTOR VEHICLES
Filed Oct. 20, 1933  2 Sheets-Sheet 2

INVENTOR.
Herman L Welch

Patented Dec. 3, 1935

2,022,833

UNITED STATES PATENT OFFICE 2,022,833

MECHANISM TO BE USED UPON MOTOR VEHICLES

Herman L. Welch, Los Angeles, Calif.

Application October 20, 1933, Serial No. 694,416

2 Claims. (Cl. 296—91)

My invention relates to windshields used upon motor vehicles and the objects of my invention are: first, to provide clear and unobstructed vision from an automobile by means of a windshield that may be opened in the line of vision; second, to prevent the entrance of wind through said windshield when open and, third, to afford facilities for the control of the device.

The mechanism, forming the subject matter of this invention, is intended to provide an efficient and simple means by which the wind may be deflected and prevented from entering the body of a motor vehicle when it is operated with the windshield open or partially open. The principle employed is that of deflecting the wind by a blast of air driven across the opening in the windshield.

The essential parts of this mechanism are first a windshield that may be opened, in the line of vision, to any desired degree, second, means for generating a blast of air and, third, means for directing the blast in a proper manner across the opening in the windshield.

It is obvious that the blast of air may be created by employing a blower, compressor or fan and that the blower, compressor or fan may be made an integral part of the flywheel of the motor or that it may be mounted on any convenient part of the automobile and that it may be driven by belt or gearing from any rotating part of the engine or transmission, or by a turbine actuated by the exhaust of the engine or by a motor connected to the electrical generator or battery and I desire to employ any of these implements or methods of drive, mounting or construction as the occasion may require.

It is further obvious that the blast of air may be conducted to the lower part of the windshield and directed upwardly across the opening therein or that it may be conducted to the upper part of the windshield and directed downwardly across the opening therein, or that it may be directed laterally across said opening and I desire to employ any of these methods, such as the construction of the car or other circumstance makes most desirable.

The best mode, that I have contemplated for applying the above mentioned principle to attain the objects of my invention is the mechanism illustrated in the accompanying drawings, in which:—

Similar numerals refer to similar parts throughout the several views.

Figure 1:
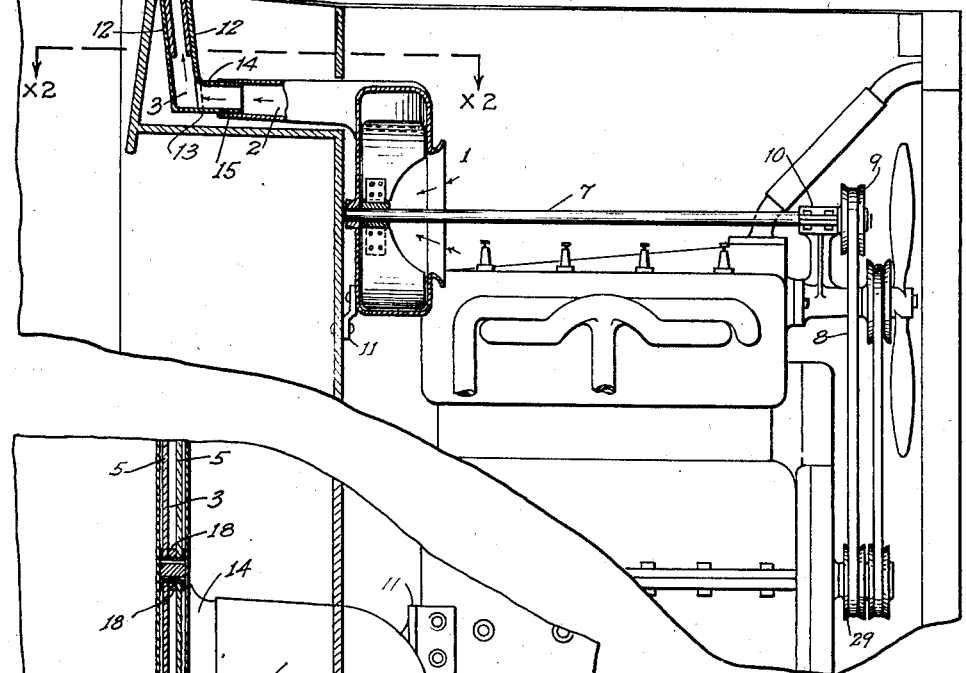
Figure 1 is a sectional side view showing the mechanism mounted in the outline of an automobile.
Figure 2:
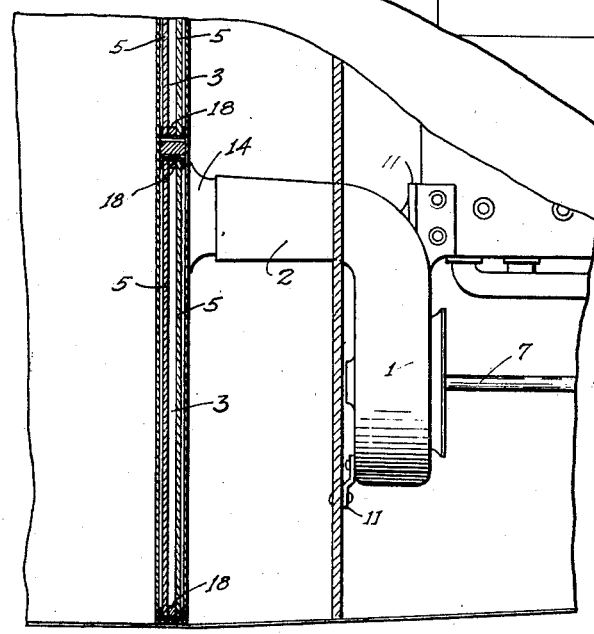
Figure 2 is a plan view on line X2, X2.
Figure 3:
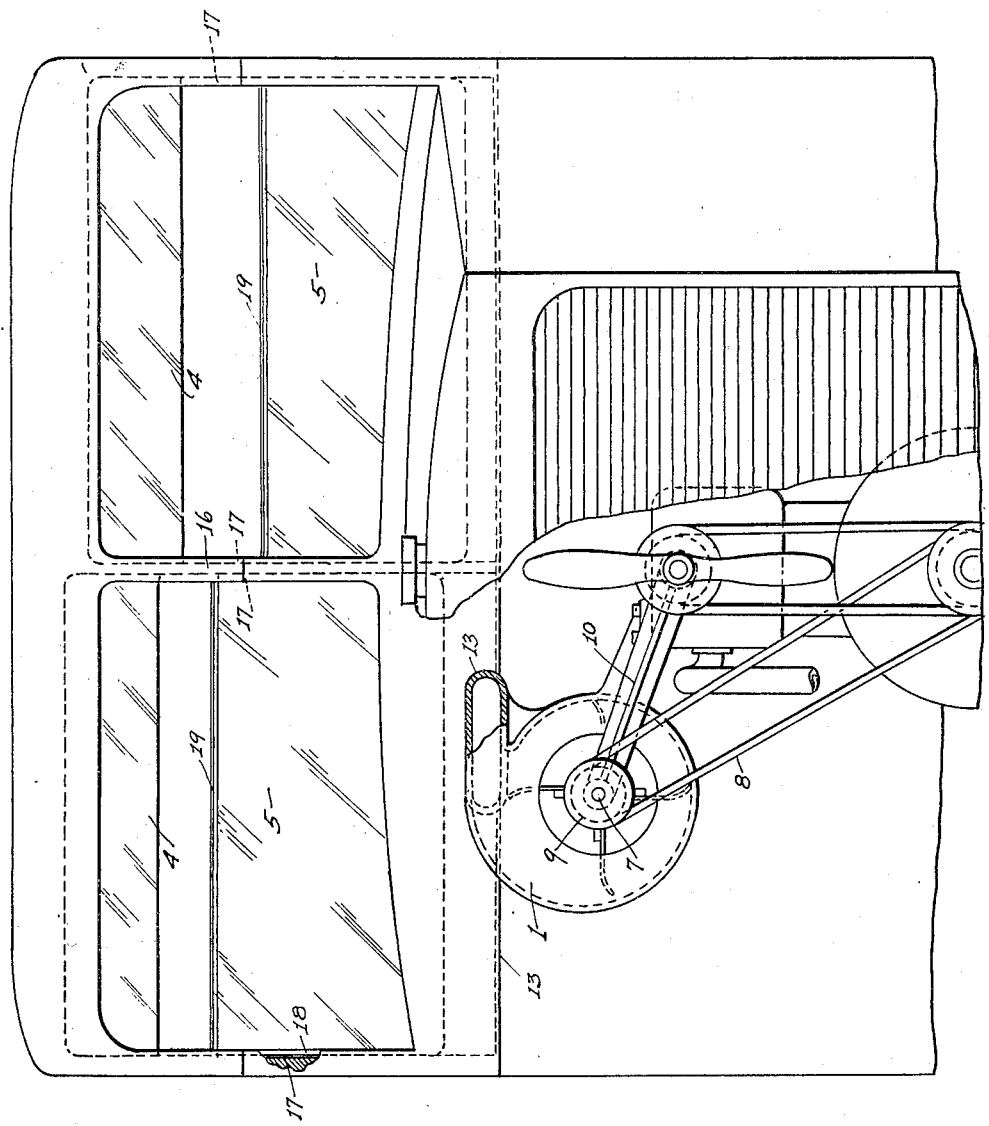
Figure 3 is a front elevation view.

The blower 1—the air conduit 2—the air chamber 3 constitute essential elements of the mechanism.

The shaft 7 of the blower 1 is driven by a belt 8 from a pulley 9 through the pulley 29 on the forward end of the engine crankshaft.

The shaft is supported by hanger 10 and the blower is secured to the bulkhead of the engine compartment by supports 11—11.

The air chamber 3 is here formed by closing the lower extension of the walls 12—12 of the windshield frame by an end piece 13. The air chamber is provided with an inlet 14 by which it is connected to the air conduit from the blower at 15. The function of the air chamber being to spread the air across the windshield it is obvious that it may be constructed in many different ways.

The windshield frame 6 is divided in equal parts by a vertical rib 16—this vertical rib and the lateral sides of the windshield frame carry slide grooves 17—17—17—17 in which the glass panels 4 and 5—5 of the windshield are slidably mounted.

The lower glass panel of the windshield is utilized to form an adjustable extension of the air blast chamber 3 by constructing each panel of two plates of glass 5—5 spaced slightly apart and connected by end blocks 18. The said double panel being slidably mounted in the slide grooves 17—17 of the windshield frame.

The air chamber is provided with a slot 19 which may be removable and adjustable through which the air escapes and by means of which it is directed across the opening in the shield.

In practice the operator of the motor vehicle opens the windshield to suit his convenience by lowering or raising the glass panels. The blower driven from the engine creates a current of air which is conducted by the air conduit 2 through the intake 14 into the air chamber 3 where it is spread across the width of the windshield and escapes through the slot 19 in a broad sheet across the width of the opening in the windshield. The movement of this sheet of air deflects the wind, created by the forward movement of the vehicle, and carries it past the opening. The operation of this device is greatly facilitated by the fact that the air into which the machine is driving is compressed against the unopened parts of the windshield and the other parts of the machine and tends to expand and escape. The sheet blast from the blower gives direction and added impulse to this tendency.

Having now pointed out the principle which I wish to employ to provide open vision and protection from wind to occupants of motor vehicles and having described a mechanism by which that principle may be utilized I claim broadly as my invention a mechanism, accessory to a motor vehicle, to create a blast of air and direct it across the open windshield of the vehicle.

I claim:—

1. In a motor vehicle, a cowl, a windshield frame having channel shaped uprights mounted on said cowl, an upper glass panel slidably mounted in said windshield frame, a casing forming an air chamber disposed forwardly of the windshield frame and extending into said cowl, a pair of glass panes spaced apart and secured together along their lateral edges slidably mounted in said casing, a blower, an air discharge conduit leading from said blower and communicating with said casing adjacent its lower end, and means for driving said blower from the engine of the vehicle whereby a blast of air may be induced across the opening between lower edge of said upper glass panel and the upper edges of said pair of panes for the purpose set forth.

2. In a motor vehicle a cowl, a windshield frame mounted on said cowl, a glass panel partly closing the opening defined by said windshield frames, a casing forming an air chamber engaging the front face of said windshield frame and extending into the cowl, a pair of glass panes spaced apart and closed along their outer edges mounted in said casing with a portion extending thereabove, a blower interconnected with said casing, an air discharge conduit leading from said blower and communicating with said casing adjacent its lower end, and means for driving said blower from the engine of the vehicle, whereby a blast of air may be induced across the opening between lower edge of said upper glass panel and the upper edges of said pair of panes for the purpose set forth.

HERMAN L. WELCH.